United States Patent [19]

Sasaki

[11] Patent Number: 5,457,693

[45] Date of Patent: Oct. 10, 1995

[54] DATA TERMINAL CONTROL UNIT INCLUDING TABLE FOR EFFICIENTLY MAKING CONNECTIONS BETWEEN DATA TERMINAL EQUIPMENTS AND BETWEEN DATA TERMINAL EQUIPMENT AND OUTSIDE LINES

[75] Inventor: Satoyuki Sasaki, Nagareyama, Japan

[73] Assignee: Sharp Kabushiki Kaisha

[21] Appl. No.: 243,008

[22] Filed: May 16, 1994

Related U.S. Application Data

[63] Continuation of Ser. No. 899,995, Jun. 17, 1992, abandoned.

[30] Foreign Application Priority Data

| | | | |
|---|---|---|---|
| Jun. 20, 1991 | [JP] | Japan | 3-148403 |
| Aug. 12, 1991 | [JP] | Japan | 3-202000 |

[51] Int. Cl.⁶ .............................. H04J 3/12; H04J 3/08; H04Q 11/04
[52] U.S. Cl. ...................... 370/110.1; 370/58.2; 370/60.1
[58] Field of Search .............................. 370/56, 92, 94.1, 370/94.2, 110.1, 58.1, 58.2, 60, 60.1; 379/160, 165, 172, 198, 216, 233, 258, 93

[56] References Cited

U.S. PATENT DOCUMENTS

| | | | |
|---|---|---|---|
| 4,930,123 | 5/1990 | Shimizu | 370/110.1 |
| 4,935,923 | 6/1990 | Shimizu et al. | 370/110.1 |
| 4,959,856 | 9/1990 | Bischoff et al. | 379/258 |
| 5,008,884 | 4/1991 | Yazawa et al. | 370/110.1 |
| 5,099,511 | 3/1992 | Matsumoto | 379/198 |

FOREIGN PATENT DOCUMENTS

| | | | |
|---|---|---|---|
| 61-257052 | 5/1985 | Japan | H04M 3/00 |
| 6411445 | 7/1987 | Japan | H04L 11/20 |

Primary Examiner—Hassan Kizou
Attorney, Agent, or Firm—David G. Conlin; Kevin J. Fournier

[57] ABSTRACT

A plurality of data terminals are connected to a plurality of ports in a data terminal control unit. A table representing correspondence in an extension number, a dial-in number and an ISDN subaddress of each data terminal equipment, the number of a port connected with each data terminal equipment, and so on is provided within the data terminal control unit. When one data terminal equipment calls another data terminal equipment, the extension number of the data terminal equipment to be called is set in a setup message. When one data terminal equipment is called from an outside line, an ISDN number thereof is set in a setup message. The setup message is then transmitted to the data terminal control unit. The data terminal control unit refers to the table, thereby to specify the data terminal equipment to be called and transmit the setup message to the corresponding data terminal equipment.

10 Claims, 13 Drawing Sheets

| TERMINAL | EXTENSION NO. | DIAL-IN NO. | PORT NO. | SUBADDRESS |
|---|---|---|---|---|
| 1 | 110 | 123451 | 31 | 11 |
| 2 | 120 | 123452 | 31 | 12 |
| 3 | 130 | 123453 | 31 | 13 |
| 4 | 210 | 123454 | 32 | 11 |
| 5 | 220 | 123455 | 32 | 12 |
| 6 | 230 | 123456 | 32 | 13 |
| 7 | 310 | 123457 | 33 | 11 |
| 8 | 320 | 123458 | 33 | 12 |
| 9 | 330 | 123459 | 33 | 13 |

FIG. 1

| TERMINAL | EXTENSION NO. | DIAL-IN NO. | PORT NO. | SUBADDRESS |
|---|---|---|---|---|
| 1 | 110 | 123451 | 31 | 11 |
| 2 | 120 | 123452 | 31 | 12 |
| 3 | 130 | 123453 | 31 | 13 |
| 4 | 210 | 123454 | 32 | 11 |
| 5 | 220 | 123455 | 32 | 12 |
| 6 | 230 | 123456 | 32 | 13 |
| 7 | 310 | 123457 | 33 | 11 |
| 8 | 320 | 123458 | 33 | 12 |
| 9 | 330 | 123459 | 33 | 13 |

CONVERSION OF ORIGINATING ISDN ADDRESS

| ORIGINATING SIDE | TERMINATING SIDE | ISDN No. BEFORE CONVERSION | ISDN SUBADDRESS BEFORE CONVERSION | ISDN No. AFTER CONVERSION | ISDN SUBADDRESS AFTER CONVERSION | FLOW CHART STEP |
|---|---|---|---|---|---|---|
| OUTSIDE LINE | EXTENSION | ORIGINATING ISDN No. *1 | ORIGINATING ISDN SUBADDRESS *2 | ORIGINATING ISDN No. *1 | ORIGINATING ISDN SUBADDRESS *2 | S2 |
| EXTENSION | EXTENSION | -- | SUBADDRESS OF ORIGINATING DATA TERMINAL | EXTENSION No. OF ORIGINATING DATA TERMINAL | -- | S7 |
| EXTENSION | OUTSIDE LINE | -- | SUBADDRESS OF ORIGINATING DATA TERMINAL | -- | EXTENSION No. OF ORIGINATING DATA TERMINAL | S5 |

CONVERSION OF TERMINATING ISDN ADDRESS

| ORIGINATING SIDE | TERMINATING SIDE | ISDN No. BEFORE CONVERSION | ISDN SUBADDRESS BEFORE CONVERSION | ISDN No. AFTER CONVERSION | ISDN SUBADDRESS AFTER CONVERSION | FLOW CHART STEP |
|---|---|---|---|---|---|---|
| OUTSIDE LINE | EXTENSION | DIAL-IN No. | -- | -- | SUBADDRESS OF TERMINATING DATA TERMINAL | S3 |
| EXTENSION | EXTENSION | EXTENSION No. OF TERMINATING DATA TERMINAL | -- | -- | SUBADDRESS OF TERMINATING DATA TERMINAL | S8 |
| EXTENSION | OUTSIDE LINE | TERMINATING ISDN No. | TERMINATING ISDN SUBADDRESS *3 | TERMINATING ISDN No. | TERMINATING ISDN SUBADDRESS *3 | S6 |

-- : THERE IS NO DATA.
*1: ORIGINATING ISDN No. IS SOMETIMES NOT TRANSMITTED.
*2: ORIGINATING ISDN SUBADDRESS IS SOMETIMES NOT TRANSMITTED.
*3: TERMINATING ISDN SUBADDRESS IS SOMETIMES NOT SET.

| DATA TERMINAL | EXTENSION No. | PORT No. | SUBADDRESS |
|---|---|---|---|
| 1 | 110 | P1 | 11 |
| 2 | 120 | P1 | 12 |
| 3 | 130 | P1 | 13 |
| 4 | 210 | P2 | 11 |
| 5 | 220 | P2 | 12 |
| 6 | 230 | P2 | 13 |
| 7 | 310 | P3 | 11 |
| 8 | 320 | P3 | 12 |
| 9 | 330 | P3 | 13 |

FIG. 7

CONVERSION OF ORIGINATING ISDN ADDRESS

| ORIGINATING SIDE | TERMINATING SIDE | ISDN No. BEFORE CONVERSION | ISDN SUBADDRESS BEFORE CONVERSION | ISDN No. AFTER CONVERSION | ISDN SUBADDRESS AFTER CONVERSION | FLOW CHART STEP |
|---|---|---|---|---|---|---|
| OUTSIDE LINE | EXTENSION | ORIGINATING ISDN No. *1 | ORIGINATING ISDN SUBADDRESS *2 | ORIGINATING ISDN No. *1 | ORIGINATING ISDN SUBADDRESS *2 | S12 |
| EXTENSION | EXTENSION | -- | SUBADDRESS OF ORIGINATING DATA TERMINAL | EXTENSION No. OF ORIGINATING DATA TERMINAL | -- | S17 |
| EXTENSION | OUTSIDE LINE | -- | SUBADDRESS OF ORIGINATING DATA TERMINAL | -- | EXTENSION No. OF ORIGINATING DATA TERMINAL | S15 |

CONVERSION OF TERMINATING ISDN ADDRESS

| ORIGINATING SIDE | TERMINATING SIDE | ISDN No. BEFORE CONVERSION | ISDN SUBADDRESS BEFORE CONVERSION | ISDN No. AFTER CONVERSION | ISDN SUBADDRESS AFTER CONVERSION | FLOW CHART STEP |
|---|---|---|---|---|---|---|
| OUTSIDE LINE | EXTENSION | -- | EXTENSION No. OF TERMINATING DATA TERMINAL | -- | SUBADDRESS OF TERMINATING DATA TERMINAL | S13 |
| EXTENSION | EXTENSION | EXTENSION No. OF TERMINATING DATA TERMINAL | -- | -- | SUBADDRESS OF TERMINATING DATA TERMINAL | S18 |
| EXTENSION | OUTSIDE LINE | TERMINATING ISDN No. | TERMINATING ISDN SUBADDRESS *3 | TERMINATING ISDN No. | TERMINATING ISDN SUBADDRESS *3 | S16 |

-- : THERE IS NO DATA.
*1: ORIGINATING ISDN No. IS SOMETIMES NOT TRANSMITTED.
*2: ORIGINATING ISDN SUBADDRESS IS SOMETIMES NOT TRANSMITTED.
*3: TERMINATING ISDN SUBADDRESS IS SOMETIMES NOT SET.

DATA TERMINAL CONTROL UNIT INCLUDING TABLE FOR EFFICIENTLY MAKING CONNECTIONS BETWEEN DATA TERMINAL EQUIPMENTS AND BETWEEN DATA TERMINAL EQUIPMENT AND OUTSIDE LINES

This is a Continuation of application Ser. No. 07/899,995 filed Jun. 17, 1992, (now abandoned).

BACKGROUND OF THE INVENTION

1. Field of the Invention

The present invention relates to an ISDN (Integrated Service Digital Network) exchange or a data terminal control unit such as of an ISDN key telephone system.

2. Description of the Background Art

Figure 9:
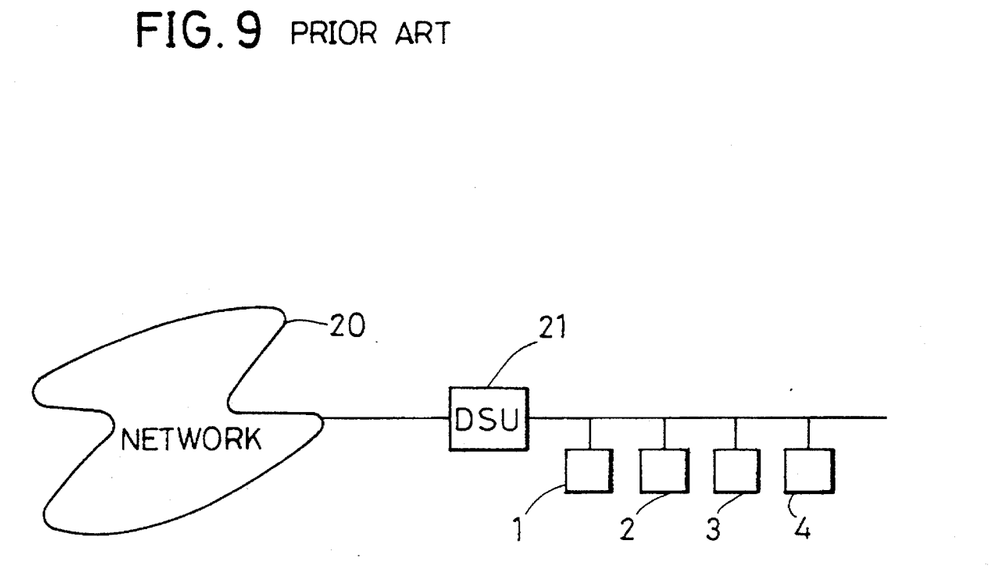
FIG. 9 is a block diagram showing connections of a general ISDN basic interface and a plurality of ISDN data terminal equipments which are multidrop-connected to the basic interface.
Figure 10:
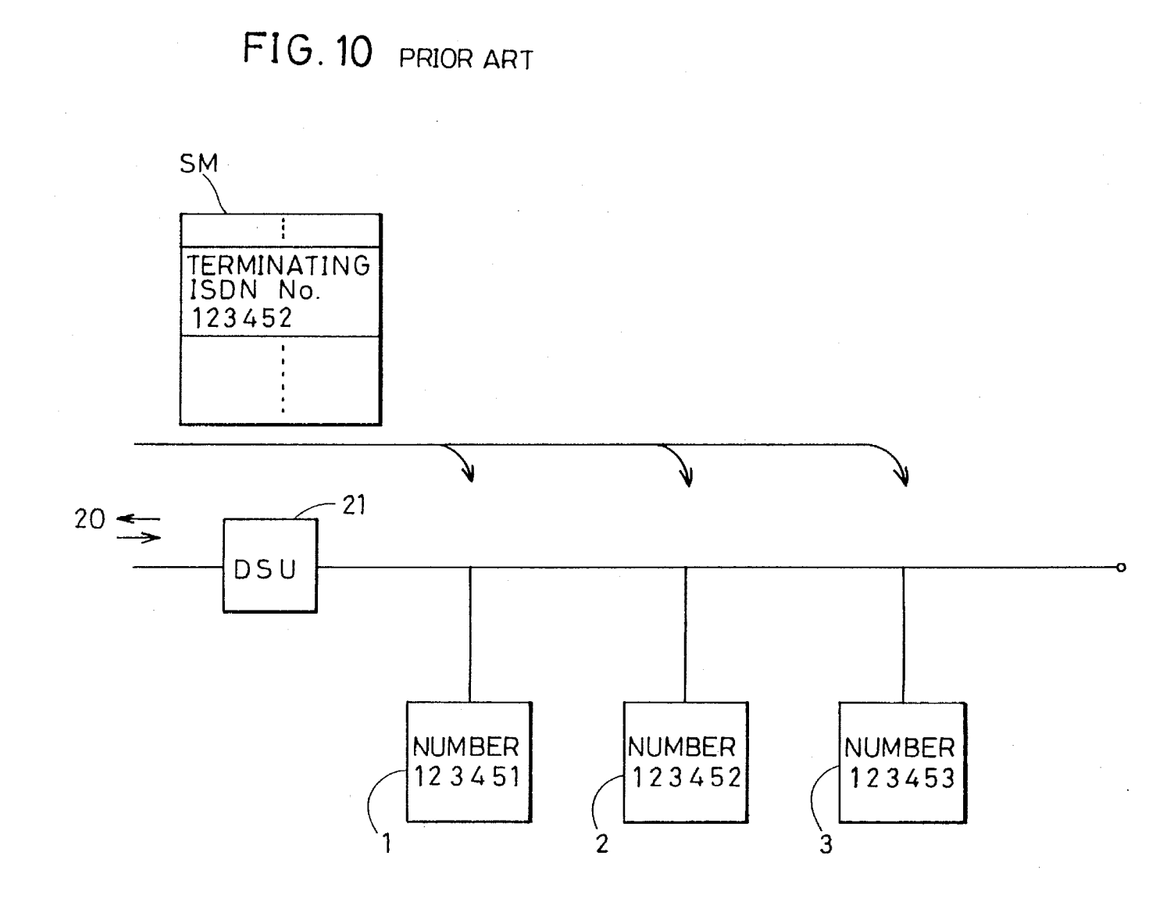
FIG. 10 is a diagram of enlargement of the detail of a subsequent structure to a DSU 21 of FIG. 9.

FIG. 9 shows structure of a basic interface of ISDN and a plurality of ISDN data terminals which are multidrop-connected to the basic interface. A communication circuit network 20 is connected via a subscriber's digital service unit (DSU) 21 to the subscriber's data terminals 1, 2, 3, 4 and so on. FIG. 10 is a diagram of enlargement of subsequent structure to DSU 21.

In ISDN, processings of originating calls and terminating calls are carried out by employing a massage called "setup message" at the time of originating and terminating. An area storing the setup message therein includes a region for storing an ISDN address therein. This ISDN address includes an originating ISDN address for designating an address of an originating data terminal and a terminating ISDN address for designating an address of a terminating data terminal. The ISDN address is further divided into an ISDN number and an ISDN subaddress.

Figure 4:
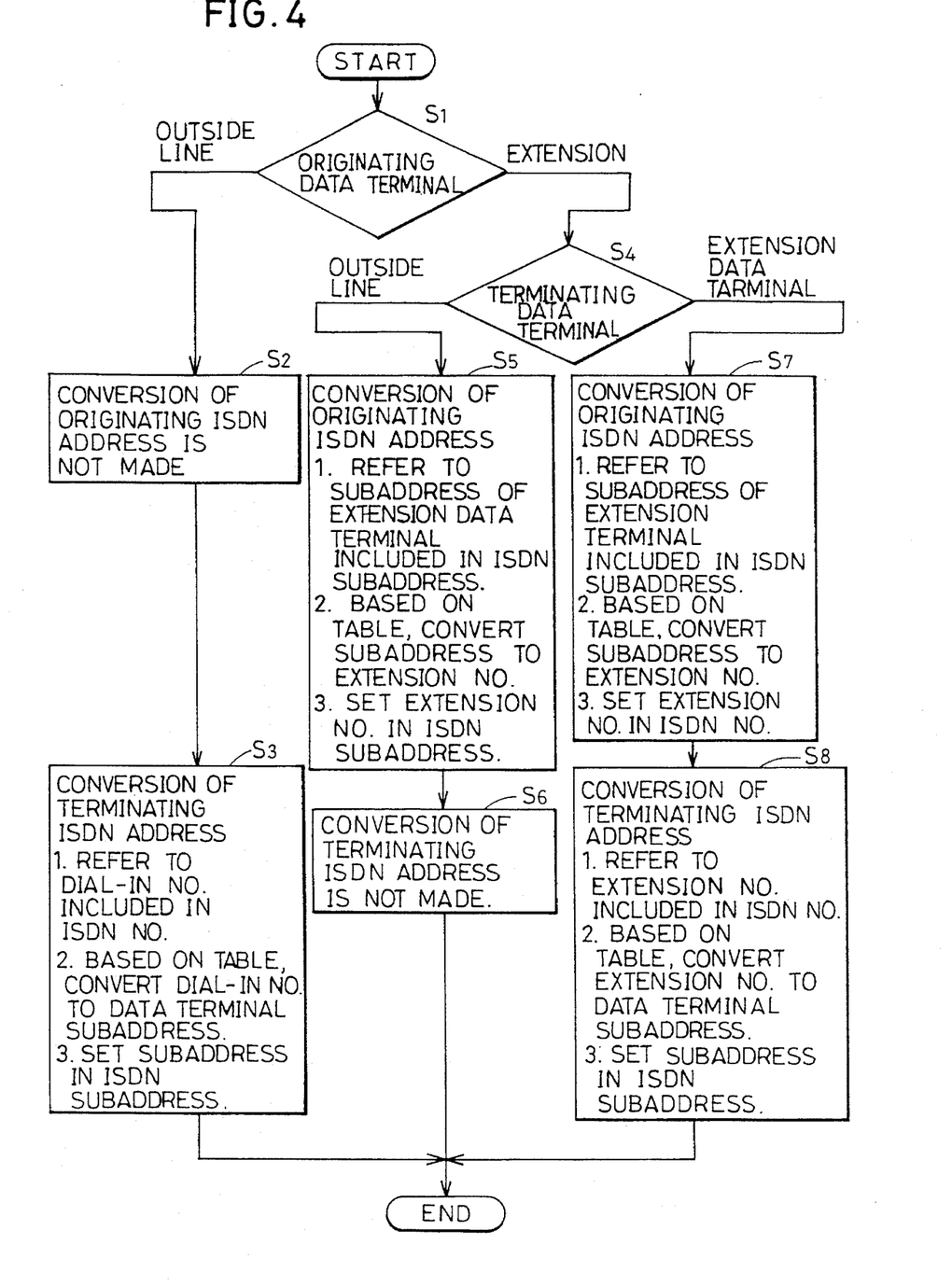
FIG. 4 is a flow chart in which the contents of the table of FIG. 3 is rewritten.
Figure 5:
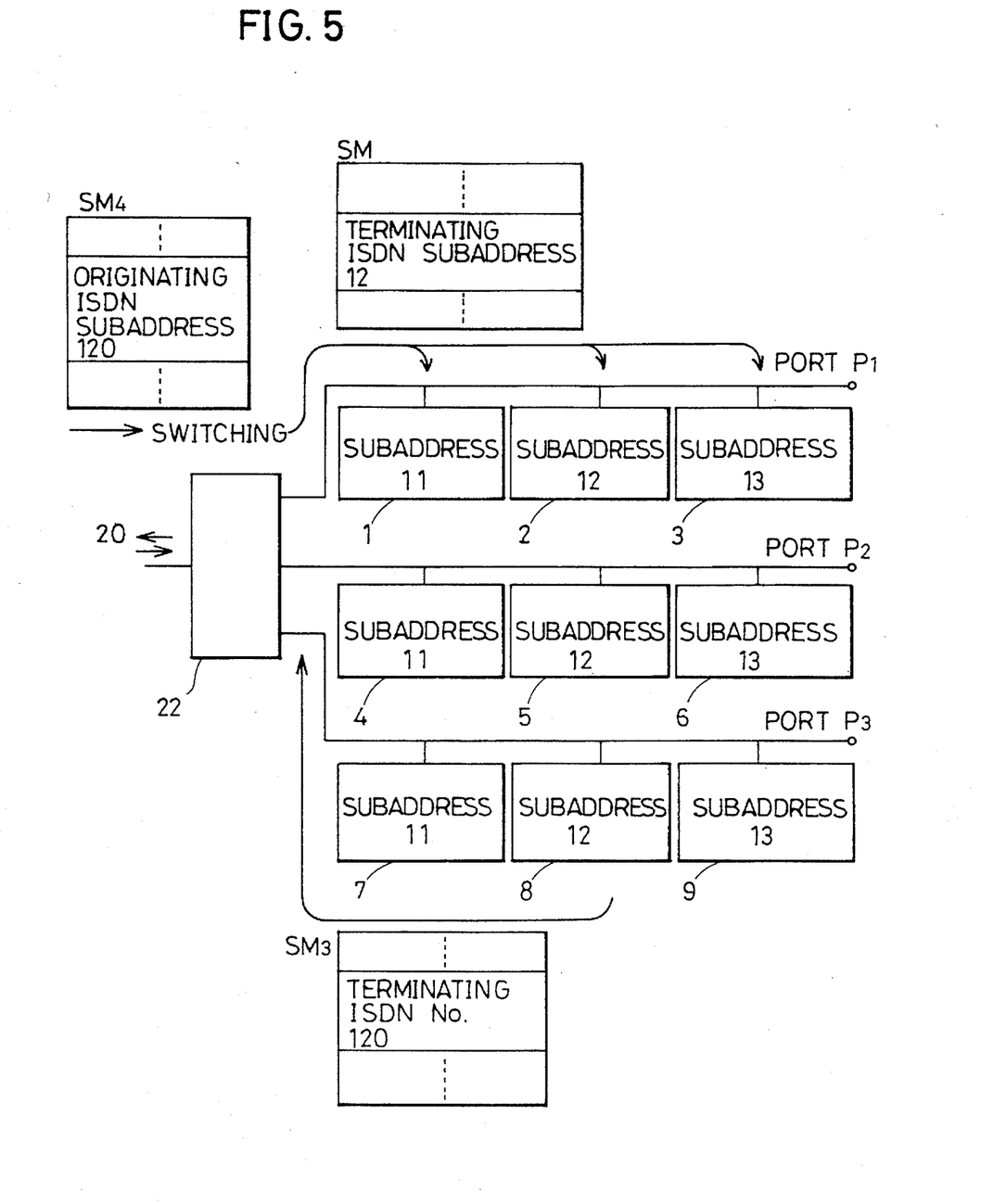
FIG. 5 is a block diagram showing circumferences of a data terminal control unit according to a second embodiment of the present invention.

In general, when a setup message is transmitted to a terminating data terminal, network 20 does not set a terminating ISDN number. As one of services conducted by network 20, however, there is a direct dial-in service. In this service, a number set to a terminating ISDN number of a setup message which is transmitted to network 20 by an originating terminal is set as a dial-in number in a terminating ISDN number of a setup message which is transmitted to a terminating terminal by the network. Accordingly, if a plurality of data terminals are multidrop-connected to a single interface as shown in FIG. 4 or 5, each data terminal can recognize whether or not the transmitted setup message is destined for itself by use of the dial-in number included in the terminating ISDN number.

When data terminals capable of recognizing ISDN numbers are connected to a single interface, these terminals store different dial-in numbers therein. As shown in FIG. 10, assume that respective data terminals 1–3 having, e.g., respective dial-in numbers 123451, 123452 and 123453 are connected via DSU 21 to network 20. When communication is intended to be made with data terminal 2 having dial-in number 123452, the originating data terminal sets dial-in number 123452 in a terminating ISDN number and transmits a setup message SM. Data terminal 2 having dial-in number 123452 refers to terminating ISDN number 123452 of transmitted setup message SM and determines that the transmitted setup message is a self-destined setup message.

Figure 11:
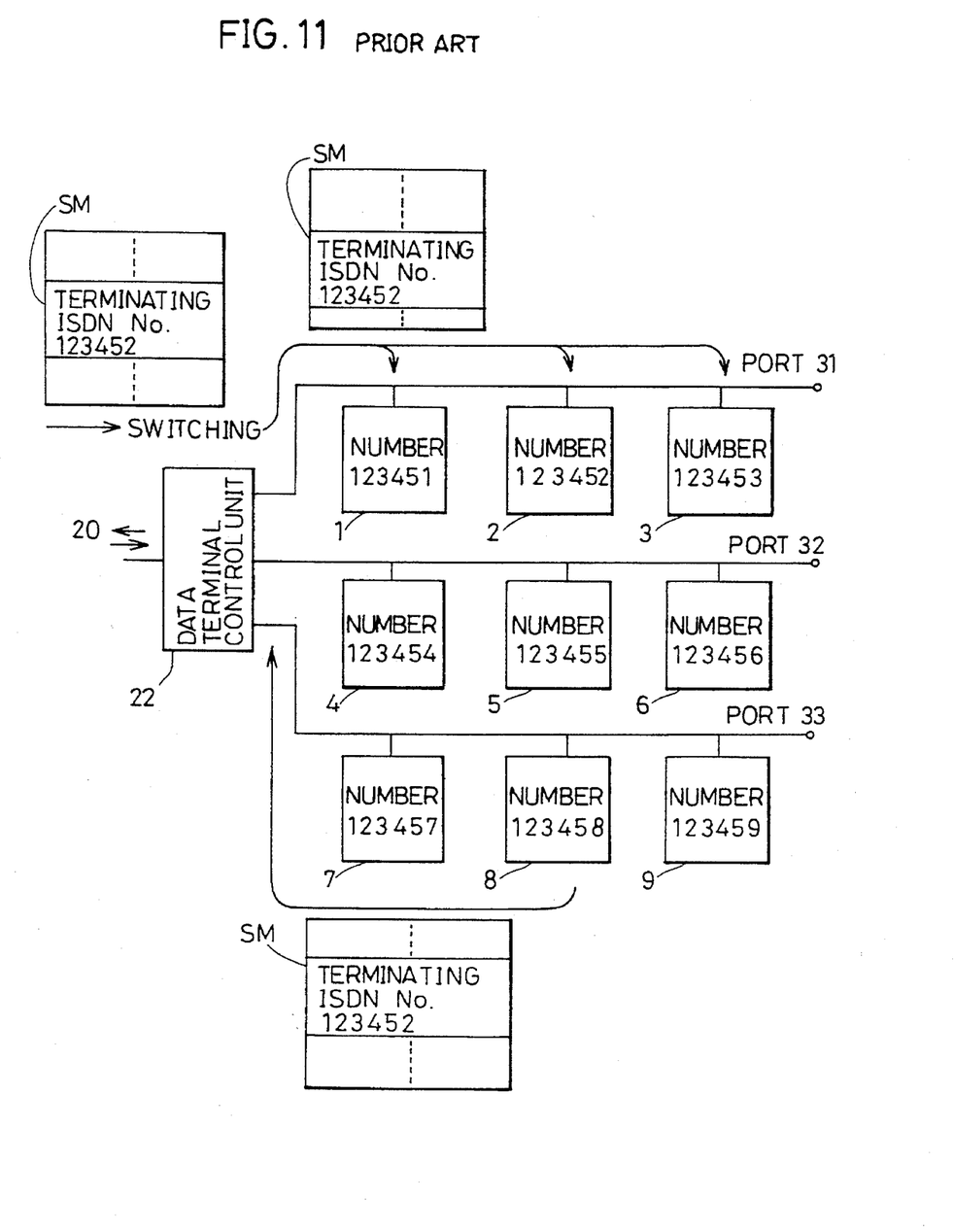
FIG. 11 is a block diagram showing circumferences of a conventional data terminal control unit.

Consideration is then made on a case where the number of interfaces on extension side is increased by connecting an ISDN exchange including a DSU or a data terminal control unit 22 including an ISDN key telephone system main apparatus between network 20 and plural terminals 1–9, as shown in FIG. 11. Referring to FIG. 11, a port 31 on extension side is connected with respective data terminals 1–3 having respective dial-in numbers 123451, 123452 and 123453, a port 32 with respective data terminals 4–6 having respective dial-in numbers 123454, 123455 and 123456, and a port 33 with respective data terminals 7–9 having respective dial-in numbers 123457, 123458 and 123459. Those ports are connected to data terminal control unit 22. When a terminal on outside-line side intends to communicate with data terminal 2 having dial-in number 123452 of port 31, the outside-line data terminal sets dial-in number 123452 in a terminating ISDN number and transmits setup message SM. Data terminal control unit 22 which has received setup message SM from network 20 refers to the terminating ISDN number of setup message SM and determines that data terminal 2 of dial-in number 123452 is connected to port 31, thereby to transmit setup message SM of terminating ISDN number 123452 to port 31.

Similarly, assume that extension terminal 8 (dial-in number 123458 of port 33) originates a call to extension data terminal 2 (dial-in number 123452 of port 31). Originating data terminal 8 sets dial-in number 123452 in a terminating ISDN number and transmits setup message SM. Data terminal control unit 22 determines a port number on the basis of the terminating ISDN number of the received setup message SM and transmits setup message SM of terminating ISDN number 123452 to port 31. In such a manner, identification of the terminating data terminal is carried out in accordance with the contents of the ISDN number set by the originating data terminal.

As described above, when communication is made by identifying a single terminal which is multidrop-connected to a single interface, it is possible to use a dial-in number set in an ISDN number. In this case, it is unnecessary to use an ISDN subaddress.

In general, when an extension data terminal calls another extension data terminal, if an extension number which is alloted to each extension data terminal by a number system independent of a dial-in number can be used, the number of digits of each number is decreased. This is therefore advantageous. In a conventional method, a dial-in number must be used even for connection from a certain extension data terminal to another extension data terminal.

In addition, when alteration is made on an extension number in a case where a dial-in number is used as the extension number, the dial-in number registered on an extension data terminal must be changed.

Figure 12:
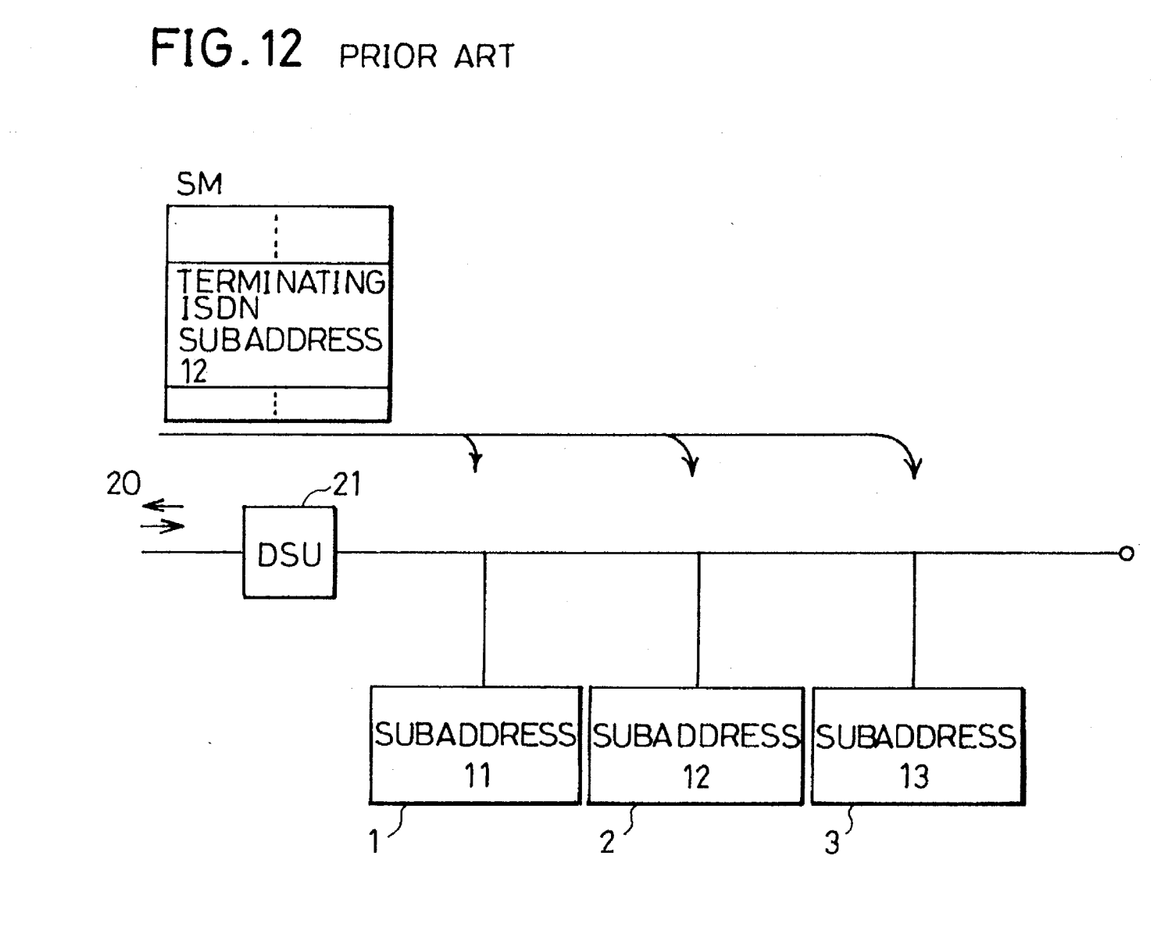
FIG. 12 is a diagram of enlargement of another example showing the detail of a subsequent structure to DSU 21 of FIG. 9.

FIG. 12 is a diagram showing another example of the detail of a subsequent structure to DSU 21 of FIG. 9. When data terminals which can recognize ISDN subaddresses are connected to one interface, these data terminals store therein different ISDN subaddresses. As shown in FIG. 12, in a case where data terminals 1, 2 and 3 having respectively, subaddresses 11, 12 and 13 are connected via DSU 21 to network 20, if communication is intended to be made with the data terminal having subaddress 12, an originating data terminal sets subaddress 12 in a terminating ISDN subaddress and transmits a setup message SM. The data terminal having subaddress 12 refers to a terminating ISDN subaddress of transmitted setup message SM and determines that the message is a setup message destined for the data terminal itself.

Figure 13:
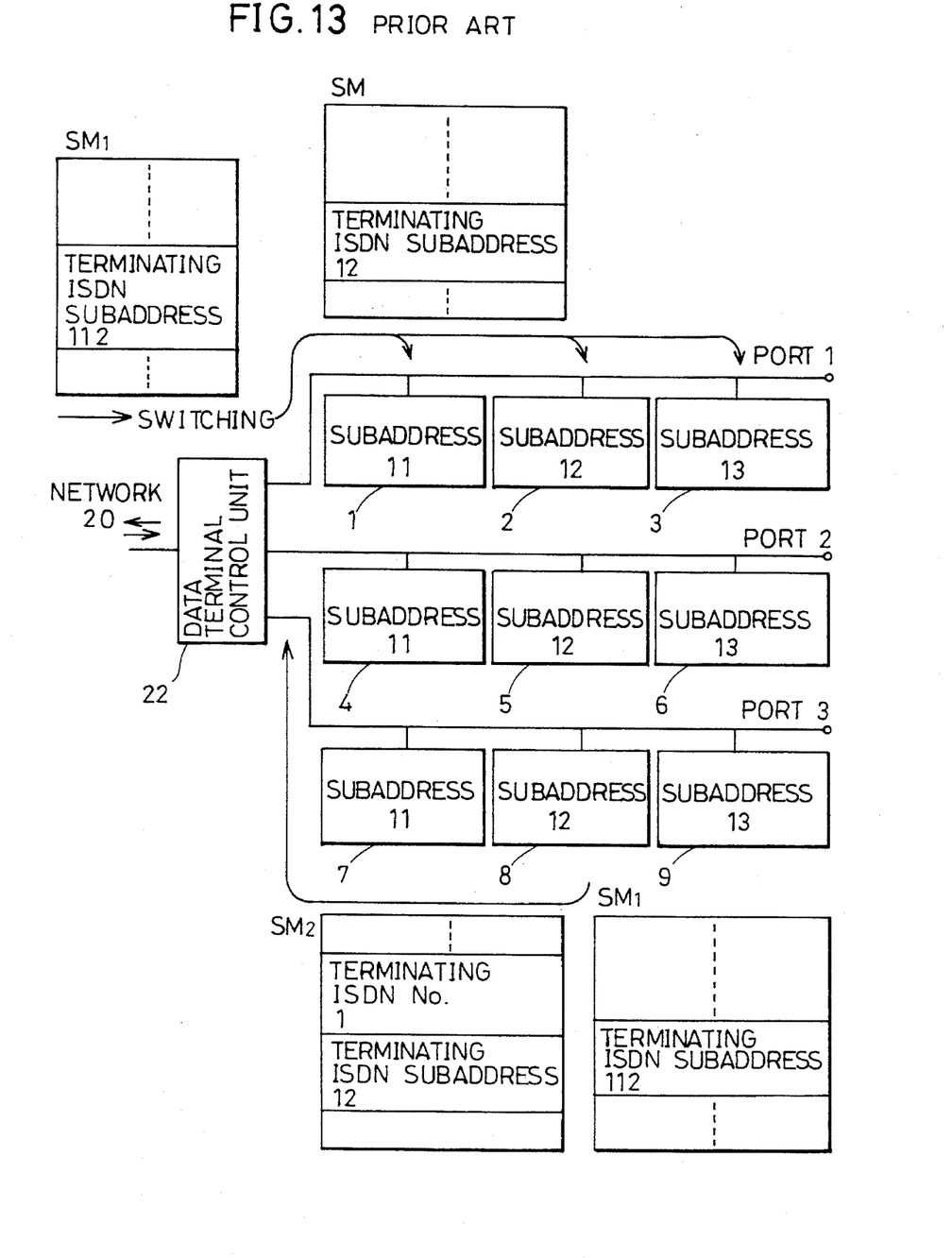
FIG. 13 is a block diagram showing circumferences of a data terminal control unit corresponding to FIG. 12.

Such a case is considered that the number of interfaces on extension side is increased by connecting an ISDN exchange or ISDN key telephone system main apparatus (hereinafter referred to as "data terminal control unit") 22 between network 20 and data terminals. First interface (a port P1) on extension side is connected with data terminals 1, 2 and 3 having, respectively, subaddresses 11, 12 and 13, a second interface (a port P2) with data terminals 4, 5 and 6 having, respectively, subaddresses 11, 12 and 13, and a third interface on extension side (a port P3) with data terminals 7, 8 and 9 having, respectively, subaddresses 11, 12 and 13. When an outside-line data terminal intends to communicate with data terminal 2 having subaddress 12 of port P1, the outside-line data terminal sets a value for identifying the port ("1" in this case) and subaddress 12 of data terminal 2 in a terminating ISDN subaddress and transmits a setup message SM1 (the value is "112"). Data terminal control unit 22 which has received setup message SM1 from network 20 refers to the terminating ISDN subaddress and transmits a setup message SM of terminating ISDN subaddress 12 to port P1.

Similarly, when extension data terminal 8 (the terminal of subaddress 12 of port P3) originates a call to extension data terminal 2 (the data terminal of subaddress 12 of port P1), (1) originating data terminal 8 transmits a setup message SM2 in which a port number 1 is set in a terminating ISDN number, and "12" in a terminating ISDN subaddress. Alternatively, (2) originating data terminal 8 transmits a setup message SM in which port number 1 and subaddress 12 are set in a terminating ISDN subaddress.

In the case (1), data terminal control unit 22 determines from the received setup message a port number on the basis of the terminating ISDN number, and transmits a setup message SM of terminating ISDN subaddress 12 to port P1. In the case (2), data terminal control unit 22 transmits setup message SM of terminating ISDN subaddress 12 from setup message SM1 to port P1. In the both cases, identification of a terminating data terminal is made on the basis of the contents of an ISDN subaddress set by an originating data terminal.

As described above, when one of data terminals which are multidrop-connected to a single interface is identified to make communications, an ISDN subaddress must be used. Accordingly, the originating data terminal sets an ISDN subaddress and transmits a setup message.

In general, however, when an extension data terminal originates a call to another extension data terminal, it is convenient to use an extension number allotted to each of extension data terminals. Since this corresponds to an ISDN number in ISDN, it is desirable to identify a terminating data terminal on the basis of the ISDN number in order to realize the same operating environment as that of a conventional data terminal control unit.

In addition, when extension numbers are changed with subaddresses used as the extension numbers, the subaddresses registered in extension data terminals must be changed.

SUMMARY OF THE INVENTION

An object of the present invention is to efficiently control communications of messages between data terminal equipments and between a data terminal equipment and an outside line in a data terminal control system.

In order to achieve the above object, a data terminal control system in accordance with the present invention includes: a plurality of data terminal equipments each having an inherent external number to the outside and capable of receiving or originating a message, and each having an inherent internal number in the inside and capable of mutually receiving or originating a message; and a data terminal control unit having one side connected with said data terminal equipments and the other side connected with an outside line, having a table of correspondence between the external number and the internal number owned by each data terminal equipment, and relaying a message.

In the data terminal control system thus structured, since the data terminal control unit has the correspondence table of the external number and the internal number, efficient control of message communications can be realized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
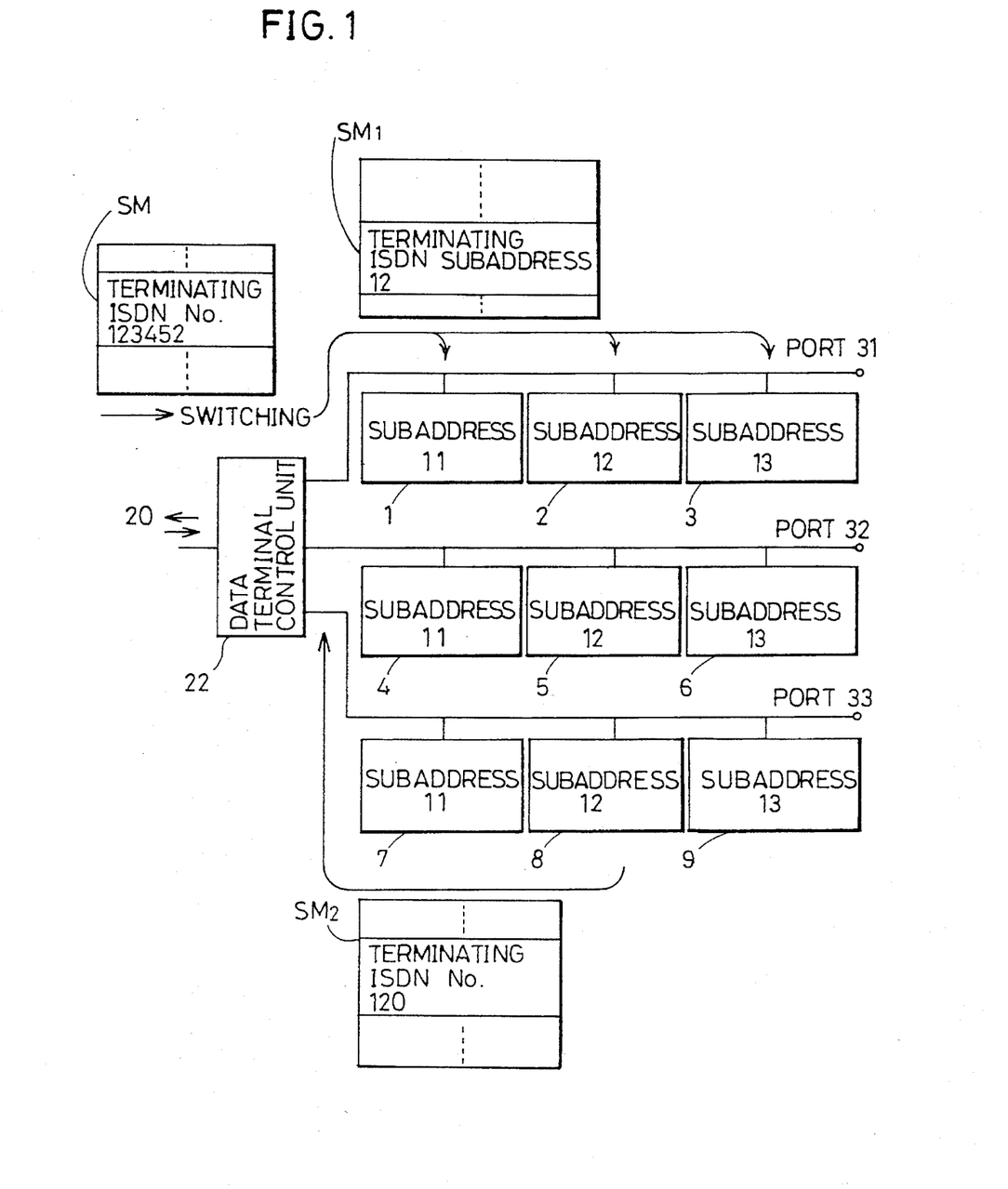
FIG. 1 is a block diagram showing circumferences of a data terminal control unit according to a first embodiment of the present invention.

FIG. 1 is a block diagram showing circumferences of a data terminal control unit according to a first embodiment of the present invention. This embodiment is different from the conventional example of FIG. 11 in that a subaddress is used in a setup message and that respective extension data terminals have their respective subaddresses and call each other by their extension numbers. The function of a data terminal control unit 22 in this embodiment is slightly different from that in the conventional example of FIG. 11.

Figure 2:
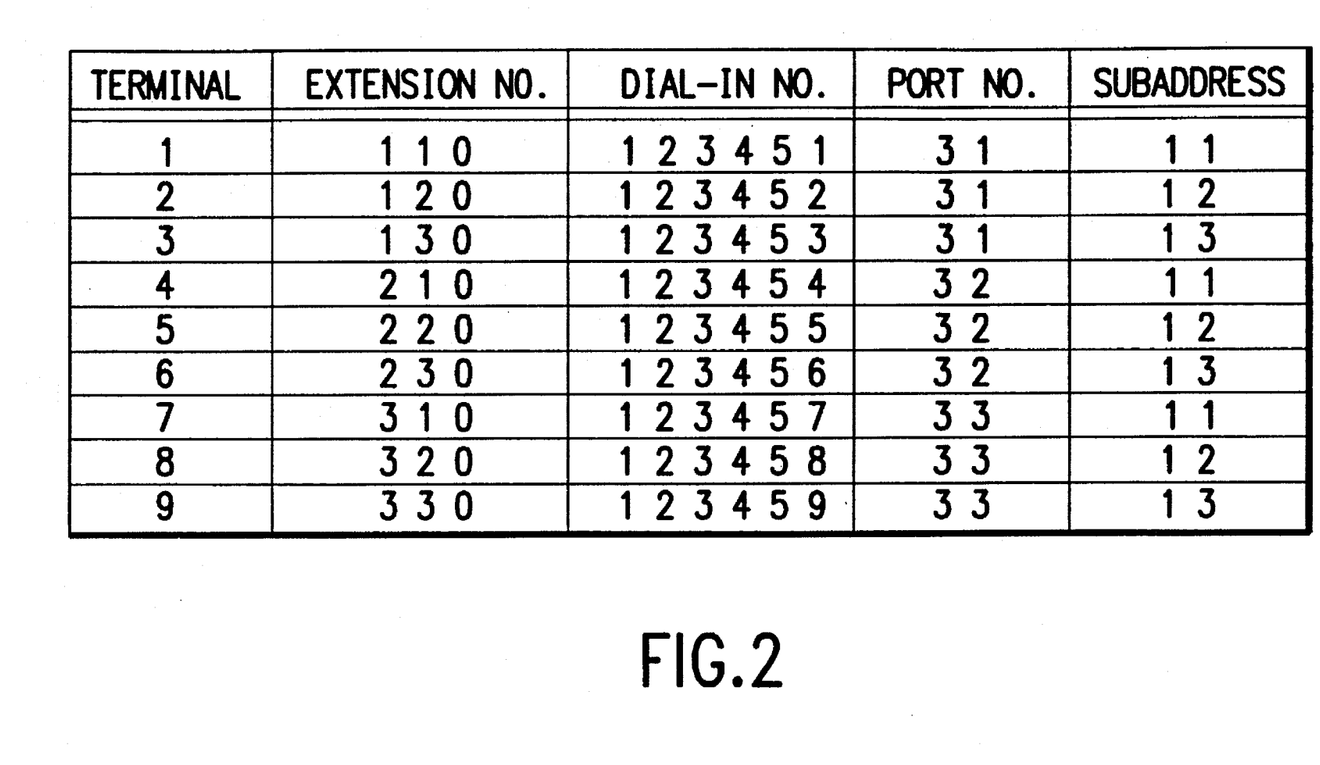
FIG. 2 is a table in which respective extension numbers, dial-in numbers, port numbers and subaddresses for respective data terminal equipments of FIG. 1 are stored.

Referring to FIG. 1, data terminal control unit 22 is connected between a network 20 and data terminals 1–9. A port 31 on extension side is connected with data terminals 1–3 having, respectively, subaddresses 11, 12 and 13, a port 32 on extension side with data terminals 4–6 having, respectively, subaddresses 11, 12 and 13, and a port 33 on extension side with data terminals 7–9 having, respectively, subaddresses 11, 12 and 13. Dial-in numbers of the respective data terminals are identical to those provided in FIG. 11. A table shown in FIG. 2 is provided in data terminal control unit 22. The table of FIG. 2 stores therein respective extension numbers, dial-in numbers, port numbers, subaddresses and like for respective data terminals 1–9.

When an outside-line data terminal intends to make communication with data terminal 2 having subaddress 12 of port 31, the outside-line data terminal sets a dial-in number 123452 in a terminating ISDN number and transmits a setup message SM. Data terminal control unit 22 which has received setup message SM from network 20 refers to the conversion table of FIG. 2, and the dial-in number in the terminating ISDN number identifies that a terminating data terminal is data terminal 2 of subaddress 12 connected to port 31. Accordingly, data terminal control unit 22 transmits a setup message SM1 of terminating ISDN subaddress 12 to port 31.

Similarly, when extension data terminal 8 (the terminal of subaddress 12 of port 33) originates a call to an extension data terminal (the terminal of subaddress 12 of port 31), originating data terminal 8 sets an extension number 120 in the terminating ISDN number and transmits a setup message SM2. Data terminal control unit 22 refers to the conversion table of FIG. 2, thereby to identify from extension number 120 in the terminating ISDN number of received setup message SM2 that the terminating data terminal is data terminal 2 of subaddress 12 connected to port 31, and transmits setup message SM1 of terminating ISDN subaddress 12 to port 31.

Figure 3:
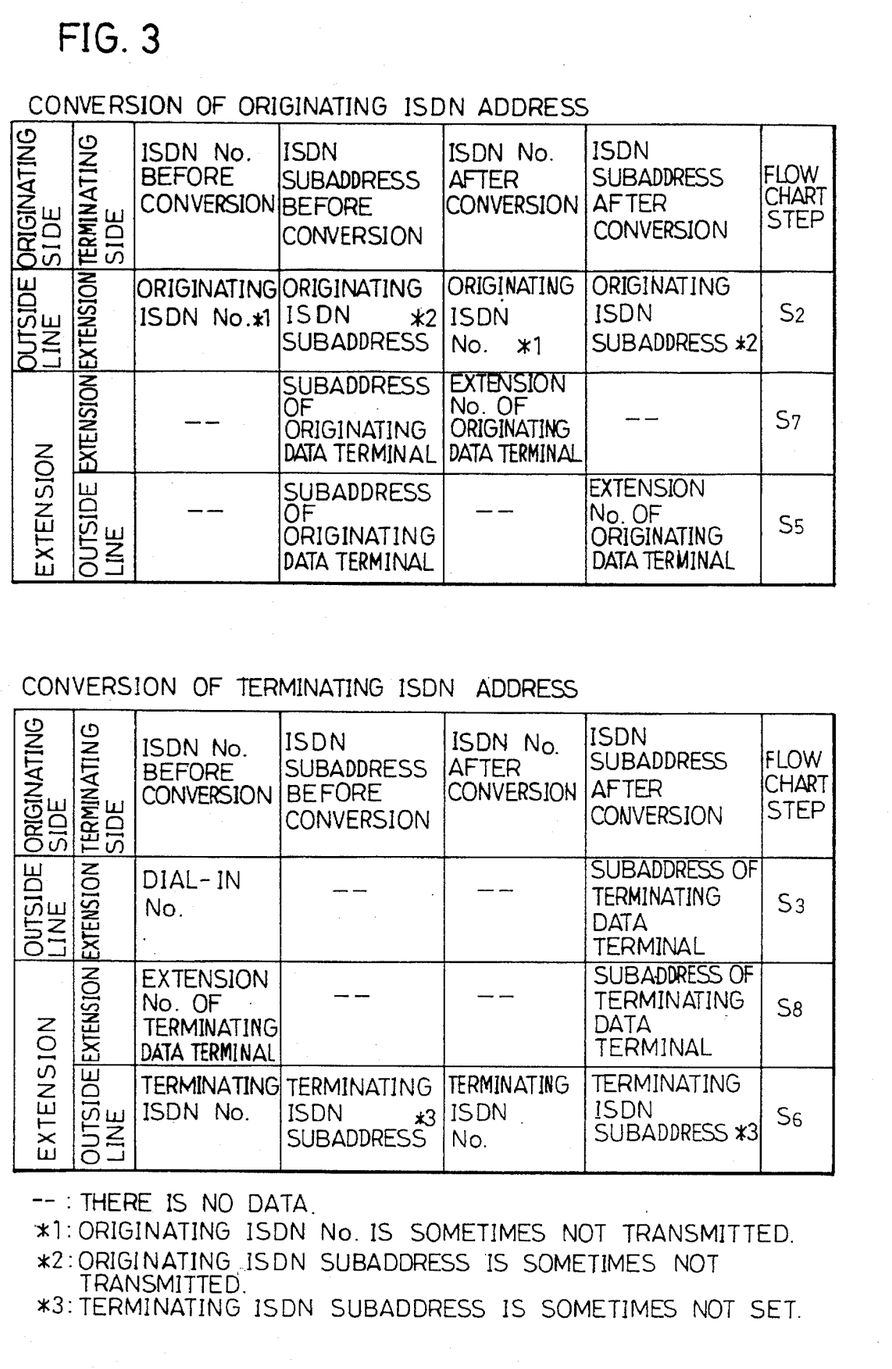
FIG. 3 is a table showing a conversion processing in the data terminal control unit of FIG. 1.

FIG. 3 is a table showing a conversion processing in the data terminal control unit of FIG. 1.

Referring to FIG. 3, when a terminal on outside-line side calls a terminal on extension side, an originating ISDN number and subaddress included in a setup message from the outside-line data terminal is unchanged and remain identical before and after conversion. This corresponds to a step S2 in a flow chart shown in FIG. 4 which will be described later.

When an extension data terminal calls another extension data terminal, the subaddress of the originating data terminal in a setup message is converted into an extension number of the originating data terminal. This corresponds to a step S7 in the flow chart of FIG. 4.

When an extension data terminal is the originating data terminal and an outside-line data terminal is the terminating data terminal, the subaddress of the originating data terminal in a setup message is converted into an extension number of the originating data terminal. This corresponds to a step S5 in the flow chart of FIG. 4.

Conversion of terminating ISDN addresses is carried out in the following process.

When an outside-line data terminal is the originating data terminal and an extension data terminal is the terminating data terminal, a dial-in number is converted into a subaddress of the terminating data terminal. This corresponds to a step S3 in the flow chart of FIG. 4.

When an extension data terminal is the originating data terminal and another extension data terminal is the terminating data terminal, an extension number of the terminating data terminal is converted into a subaddress of the terminating data terminal. This corresponds to a step S8 in the flow chart of FIG. 4.

When an extension data terminal is the originating data terminal and an outside-line extension terminal is the terminating data terminal, there is no change in terminating ISDN number or terminating ISDN subaddress. This corresponds to a step S6 in the flow chart of FIG. 4.

FIG. 4 is a flow chart rewritten from the foregoing table of FIG. 3. A detailed operation in each step is described in its block.

In the data terminal control unit of the first embodiment, identification of terminating extension data terminals in a setup message is made by using subaddresses set in the terminals; however, when viewed from the outside-line data terminal, it appears that the identification of terminating data terminals is made by using dial-in numbers, while when viewed from extension data terminals, it appears that the identification of terminating data terminals is made by using extension numbers controlled by the data terminal control unit. Accordingly, the outside-line data terminal is able to designate a terminating data terminal by a dial-in number in communication between the outside-line data terminal and an extension data terminal. In addition, in communication between an extension data terminal and another extension data terminal, the extension data terminal is able to designate a terminating data terminal by an extension number.

Moreover, the data terminal control unit of the first embodiment has a table representing correspondences of extension numbers and dial-in numbers of respective terminals, numbers of the ports connected with the terminals and subaddresses of the terminals, and carries out conversion between ISDN numbers and ISDN subaddresses. Therefore, upon changes in dial-in numbers and extension numbers of the data terminals, it is appropriate to change the table in the data terminal control unit, and it is hence unnecessary to rewrite the subaddresses stored in the respective data terminals.

Figure 6:
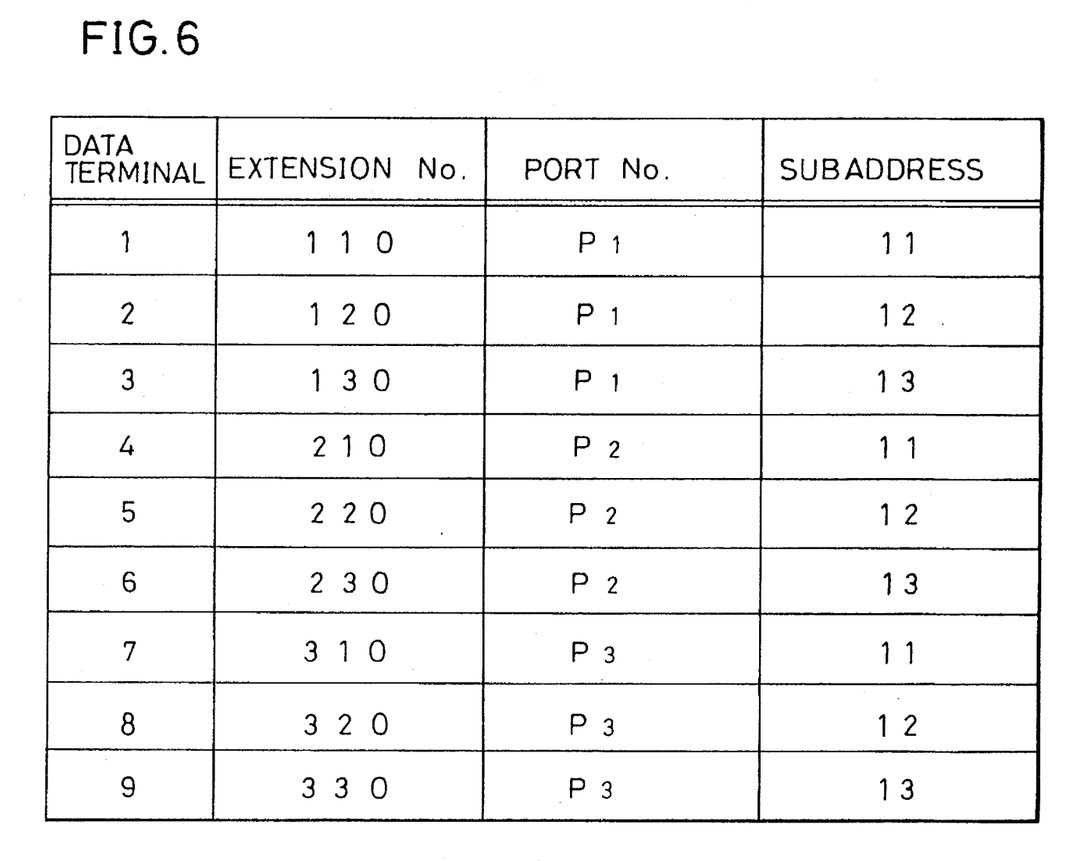
FIG. 6 is a table in which respective extension numbers, port numbers and subaddresses for respective data terminal equipments of FIG. 5 are stored.

FIG. 5 is a block diagram showing circumferences of a data terminal control unit according to a second embodiment of the present invention. FIG. 6 is a table representing conversions of extension numbers, port numbers and subaddresses of respective data terminals.

With reference to FIG. 5, assume that a data terminal control unit 22 is connected between a network 20 and data terminals 1–9, and a port P1 on extension side is connected with data terminals 1, 2 and 3 having, respectively, subaddresses 11, 12 and 13, a port P2 on extension side with data terminals 4, 5 and 6 having, respectively, subaddresses 11, 12 and 13, and a port P3 on extension side with data terminals 7, 8 and 9 having, respectively, subaddresses 11, 12 and 13. When an outside-line data terminal intends to make communication with data terminal 2 having subaddress 12 of port P1, the outside-line data terminal sets an extension number 120 in a terminating ISDN subaddress and transmits a setup message SM4. Data terminal control unit 22 which has received setup message SM4 from network 20 refers to the conversion table of FIG. 6 incorporated therein, thereby to identify on the basis of the extension number in the terminating ISDN subaddress that the terminating data terminal is data terminal 2 of subaddress 12 connected to port P1, and transmits a setup message SM of terminating ISDN subaddress 12 to port P1.

Similarly, when extension data terminal 8 (the terminal of subaddress 12 of port P3) originates a call to extension data terminal 2 (the terminal of subaddress 12 of port P1), originating data terminal 8 sets extension number 120 in a terminating ISDN number and transmits a setup message SM3. Data terminal control unit 22 refers to the conversion table of FIG. 6, thereby to identify on the basis of the extension number in the terminating ISDN number of received setup message SM3 that the terminating data terminal is data terminal 2 of subaddress 12 connected to port P1, and transmits a setup message SM of terminating ISDN subaddress 12 to port P1.

Figure 7:
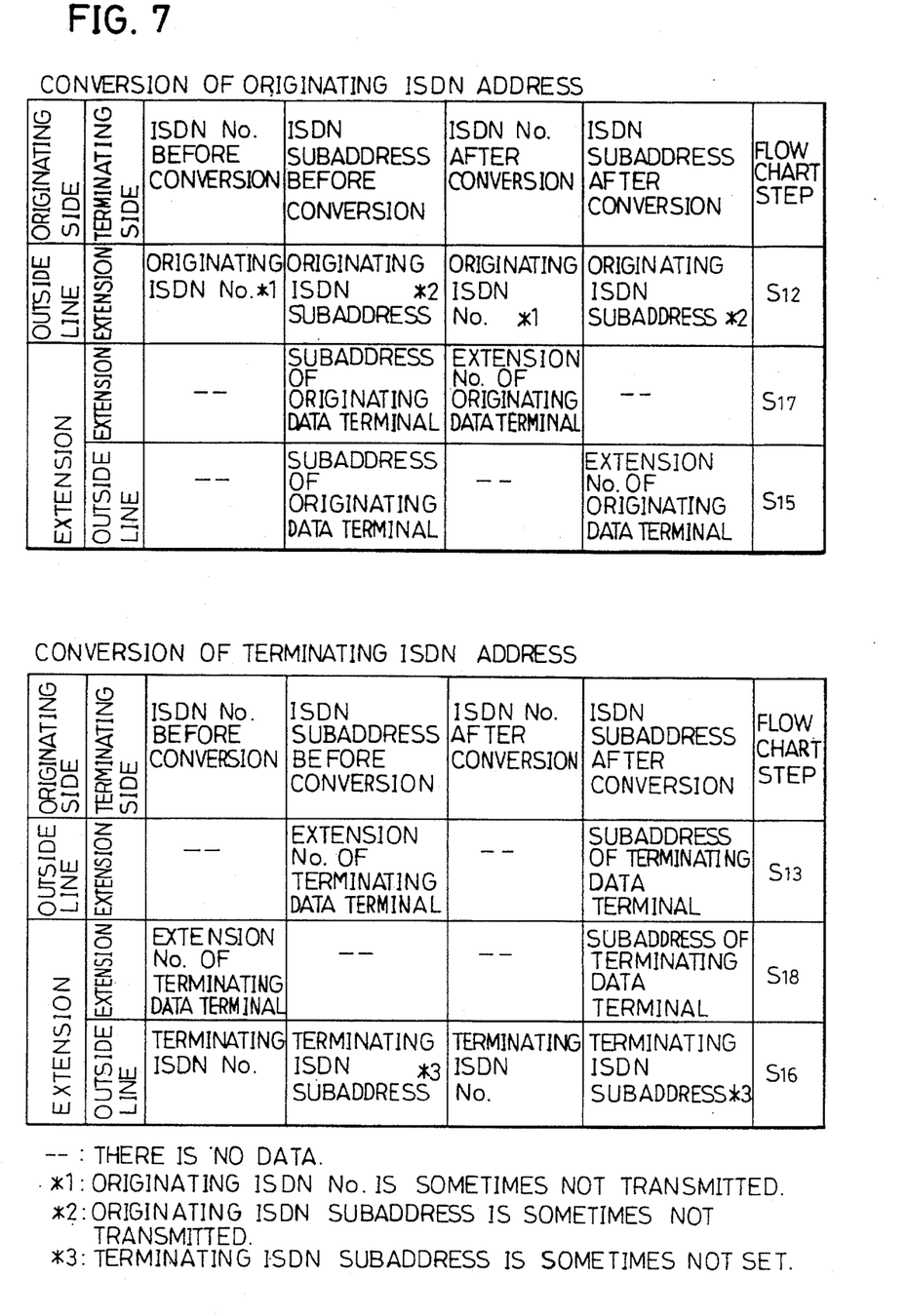
FIG. 7 is a table showing a conversion processing in the data terminal control unit of FIG. 5.

FIG. 7 is a table representing the conversion processing in the data terminal control unit of FIG. 5. Conversion of originating ISDN addresses is carried out in the following process.

When the outside-line data terminal is the originating data terminal and an extension data terminal is the terminating data terminal, no conversion processing is carried out. This corresponds to a step S12 in a flow chart of FIG. 8.

When an extension data terminal is the originating data terminal and another extension data terminal is the terminating data terminal, a subaddress of the originating data terminal is converted into an extension number of the originating data terminal in accordance with the table, and the result of conversion is set in an ISDN number. This corresponds to a step S17 in the flow chart of FIG. 8.

When an extension data terminal is the originating data terminal and the outside-line data terminal is the terminating data terminal, a subaddress of the originating data terminal is converted into an extension number of the originating data terminal on the basis of the table, and the result of conversion is set in an ISDN subaddress. This corresponds to a step S15 in the flow chart of FIG. 8.

Conversion of the terminating ISDN address is carried out in the following process.

When the outside-line data terminal is the originating data terminal and an extension data terminal is the terminating data terminal, an extension number of an ISDN subaddress is converted into a subaddress of the terminating data terminal, and the result of conversion is set in the ISDN subaddress. This corresponds to a step S13 in the flow chart of FIG. 8.

When an extension data terminal is the originating data terminal and another extension data terminal is the terminating data terminal, an extension number of an ISDN number is converted into a subaddress of the extension data terminal, and the result of conversion is set in an ISDN subaddress. This corresponds to a step S18 in the flow chart of FIG. 8.

When an extension data terminal is the originating data terminal and the outside-line data terminal is the terminating data terminal, conversion of an ISDN number and ISDN subaddress is not carried out. This corresponds to a step S16 in the flow chart of FIG. 8.

Figure 8:
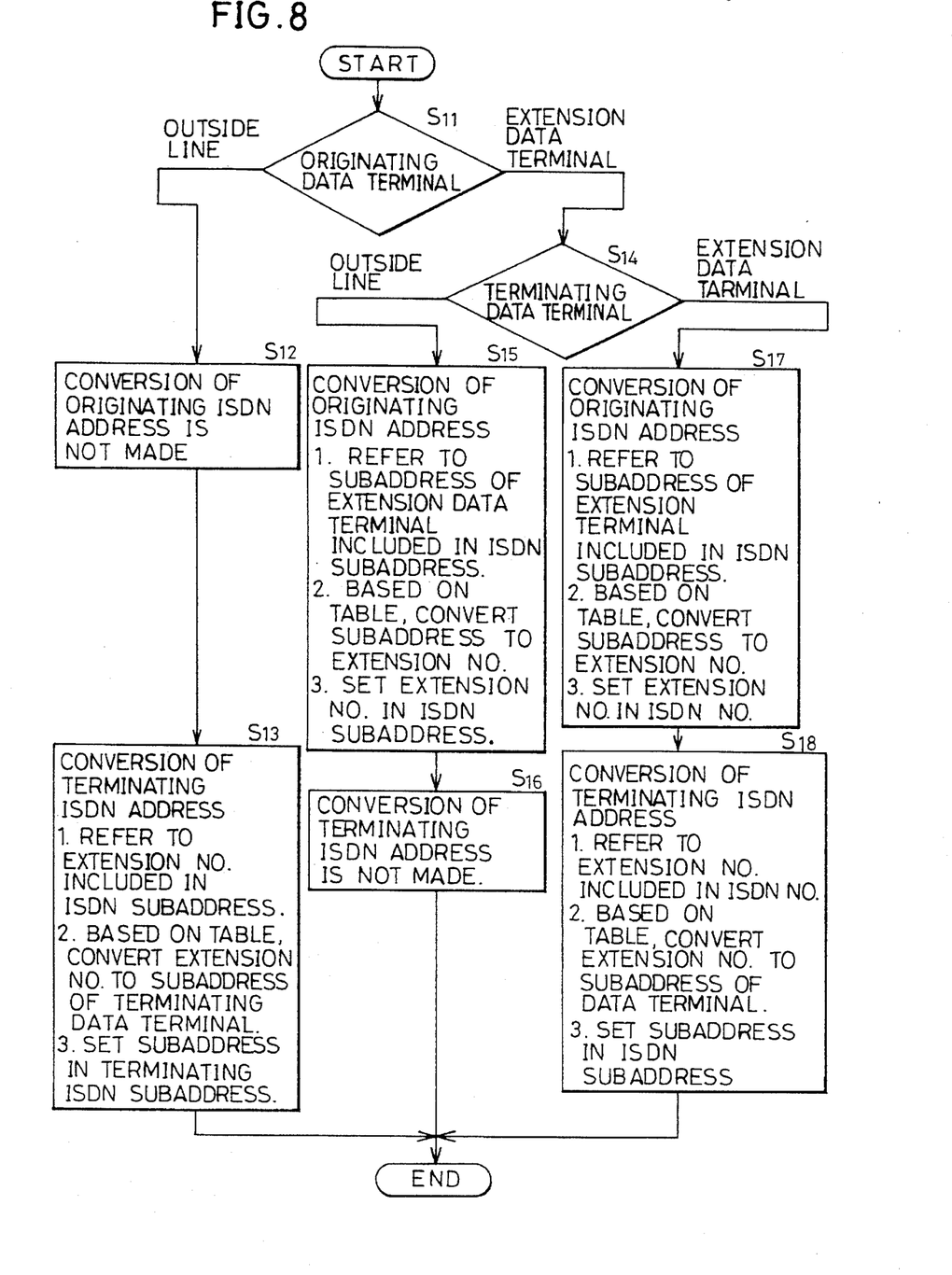
FIG. 8 is a flow chart in which the contents of the table of FIG. 7 is rewritten.

FIG. 8 is a flow chart rewritten from the table of FIG. 7. The detail in each step is described in its block.

In the data terminal control unit according to the second embodiment, identification of a terminating extension data terminal in a setup message is made by using a subaddress set in the terminal; however, when viewed from an originating data terminal, it appears that identification of the terminating data terminal is made by using an extension number controlled by the data terminal control unit. Accordingly, in communication between the outside-line data terminal and the extension data terminal, the outside-line data terminal is able to designate the terminating data terminal by an ISDN subaddress. In communication between extension data terminals, the extension data terminal is able to designate the terminating data terminal by using an ISDN number. This makes it possible to make the operating environment of this data terminal control unit identical to that of the conventional data terminal control unit.

The data terminal control unit according to the second embodiment carries out conversion between ISDN numbers and ISDN subaddresses by using the table representing the correspondence of the extension numbers of the respective data terminals, the numbers of the ports connected with the data terminals, and the subaddresses of the data terminals. Therefore, in order to change the extension numbers of the terminals, it is appropriate to change the table in the data terminal control unit, and it is hence unnecessary to rewrite the subaddresses stored in the respective terminals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data terminal control unit having one side connected with a plurality of data terminal equipments and the other side connected with an outside line, said data terminal control unit comprising:

a table in which a correspondence is made between a plurality of first numbers, one corresponding to each of said data terminal equipments for use by said control unit in relaying messages from said outside line, and a plurality of second number for use by said control unit in relaying messages between each of said data terminal equipments, wherein said data terminal equipments are divided into a plurality of groups, and a data terminal equipment belonging to a group is connected to said data terminal control unit via a port provided for said group; and means for changing said second number for a selected data terminal equipment by only altering said table.

2. The data terminal control unit as recited in claim 1, wherein
said first number is a dail-in number.

3. The data terminal control unit as recited in claim 2, wherein
said second number is an extension number.

4. The data terminal control unit as recited in claim 3, wherein
each of said ports is assigned a port number, and each terminal equipment is assigned a subaddress.

5. The data terminal control unit as recited in claim 4, wherein
said table also lists said port number and said subaddress.

6. The data terminal control unit as recited in claim 1, wherein
said first number includes an ISDN subaddress.

7. A data terminal control system, comprising:

a plurality of data terminal equipments each having a dial-in number, each having an extension number and each having a subaddress;

a data terminal control unit having one side connected with said data terminal equipments and the other side connected with an outside line, said control unit having an identification means for identifying a dial-in number or an extension number for an incoming message, and having a table in which correspondence is made between a dial-in number, a subaddress and an extension number of said data terminal equipments; and means for changing an extension number of a data terminal equipment by only altering said table.

8. The data terminal control system as recited in claim 7, wherein said data terminal control unit further includes, conversion means, when a message is originated from the outside line and said number identified is a dial-in number, for converting the dial-in number into a corresponding subaddress on the basis of said correspondence table, and transmission means for transmitting a message to a data terminal equipment specified by said corresponding subaddress.

9. A data terminal control unit connected between a plurality of data terminal equipments and an outside line, wherein said data terminal equipments are divided into a plurality of groups, and each group has a port connecting the equipments belonging to the group to said data terminal control unit, said control unit comprising:

a table for establishing a correspondence between a dial-in number, an extension number and a subaddress which are allotted to each of said plurality of data terminal equipments and the number of a port in said data terminal control unit connected with a corresponding group of said data terminal equipments;

identification means for identifying in accordance with a received setup message whether an incoming call has originated from a data terminal equipment or said outside line and whether said call is terminating at a data terminal equipment or said outside line;

extension number or dial-in number detection means for detecting the extension number or the dial-in number of a data terminal equipment to be connected in accordance with an identification result obtained by said identification means;

table reference means for referring to said table to identify on the basis of said detected extension number or dial-in number a subaddress of the data terminal equipment whose extension number was detected by said detection means and the number of the port to which the data terminal equipment is connected;

transmission means for transmitting to said port identified by said reference means, a setup message including the subaddress identified to call the data terminal equipment; wherein identification of the data terminal equipment is made by said reference means in accordance with information of a dial-in number included in an ISDN number in the received setup message when said call originated from the outside line or the identification is made in accordance with information of an extension number included in the ISDN number in the received setup message when said call originated from the data terminal equipment.

10. A data terminal control unit connected between a plurality of data terminal equipments and an outside line, wherein said data terminal equipments are divided into a plurality of groups, and each group has a port connecting the equipments belonging to the group to said data terminal control unit, said control unit comprising:

a table for establishing a correspondence between an extension number and a subaddress which are allotted to each of said plurality of data terminal equipments and the number of a port in said data terminal control unit connected with a corresponding group of said data terminal equipments;

identification means for identifying in accordance with a received setup message whether an incoming call has originated from a data terminal equipment or said outside line and whether said call is terminating at a data terminal equipment or said outside line;

extension number detection means for detecting the extension number of a data terminal equipment to be connected in accordance with an identification result obtained by said identification means;

table reference means for referring to said table to identify on the basis of said detected extension number a subaddress of the data terminal equipment and the number of the port to which the data terminal equipment is connected;

transmission means for transmitting to said port identified by said reference means a setup message including the subaddress identified to call the data terminal equipment;

wherein identification of the data terminal equipment is made by said reference means in accordance with information included in an ISDN subaddress in a received setup message when said call originated from the outside line, or the identification is made in accordance with extension number information included in an ISDN number in the received setup message when said call originated from the data terminal equipment.

* * * * *